United States Patent [19]

Turbett et al.

[11] 4,376,180

[45] Mar. 8, 1983

[54] ETHYLENE POLYMERS STABILIZED AGAINST WATER-TREEING BY N-PHENYL SUBSTITUTED AMINO SILANES; AND THE USE OF THESE COMPOSITIONS AS INSULATION ABOUT ELECTRICAL CONDUCTORS

[75] Inventors: Robert J. Turbett, Millington, N.Y.; Arnold C. Ashcraft, Hightstown, N.J.; Herbert E. Petty, Bethel, Conn.

[73] Assignee: Union Carbide Corporation, Danbury, Conn.

[21] Appl. No.: 307,244

[22] Filed: Sep. 30, 1981

[51] Int. Cl.$^3$ ............................ C08K 5/54; H01B 3/30
[52] U.S. Cl. ............................ 524/188; 174/110 R; 174/110 PM; 174/110 SR; 252/567; 252/573
[58] Field of Search ............... 260/45.9 QA, 45.9 QB; 174/110 PM, 110 SR, 110 R; 556/413; 524/188; 252/567, 573

[56] References Cited

U.S. PATENT DOCUMENTS

| | | | |
|---|---|---|---|
| 3,647,749 | 3/1972 | Zaweski | 260/45.85 |
| 3,808,172 | 4/1974 | Albarino et al. | 556/413 |
| 3,823,114 | 7/1974 | Albarino et al. | 260/45.9 R |
| 3,864,373 | 2/1975 | Seiler et al. | 556/413 |
| 4,263,158 | 4/1981 | Ashcraft | 174/110 PM |
| 4,299,713 | 10/1981 | Maringer et al. | 174/110 PM |

FOREIGN PATENT DOCUMENTS

| | | |
|---|---|---|
| 688662 | 6/1964 | Canada . |
| 2737430 | 2/1979 | Fed. Rep. of Germany . |
| 2353119 | 5/1976 | France . |
| 246827 | 6/1969 | U.S.S.R. . |

*Primary Examiner*—Veronica P. Hoke
*Attorney, Agent, or Firm*—James C. Arvantes

[57] ABSTRACT

Compositions, devoid of fillers, comprising an ethylene polymer and an N-phenyl substituted amino silane, which can be extruded about electrical conductors to provide insulation thereon which is resistant to the formation of water trees.

14 Claims, No Drawings

ETHYLENE POLYMERS STABILIZED AGAINST WATER-TREEING BY N-PHENYL SUBSTITUTED AMINO SILANES; AND THE USE OF THESE COMPOSITIONS AS INSULATION ABOUT ELECTRICAL CONDUCTORS

SUMMARY OF THE INVENTION

This invention relates to ethylene polymers which are stabilized against water-treeing by the addition thereto of an N-phenyl substituted amino silane having the formula:

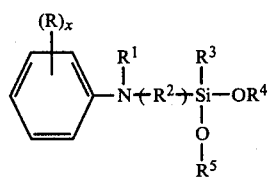

wherein: R is a monovalent hydrocarbon radical; x has a value of 0 to 1 inclusive, $R^1$ is hydrogen or a monovalent hydrocarbon radical, $R^2$ is a divalent hydrocarbon radical, $R^3$ is a monovalent hydrocarbon radical or an oxy substituted monovalent hydrocarbon radical; $R^4$ is a monovalent hydrocarbon radical having at least 8 carbon atoms and $R^5$ is a monovalent hydrocarbon radical. The compositions of this invention are useful as extrudates about electrical conductors, providing insulation thereon which is resistant to water-treeing.

BACKGROUND OF THE INVENTION

Ethylene polymers have been modified by the addition thereto of organo silanes for the purpose of providing compositions which have improved resistance to water-treeing and consequently improved electrical properties. For example, γ-aminopropyltriethoxysilane has been added to polyethylene and the resultant composition suggested for use as insulation about electrical conductors, as described in German Offenlegungsschrift No. 2,727,430, published Feb. 22, 1979.

The addition of such amino substituted organo silanes to ethylene polymers for the purpose of improving electrical properties has not proved to be particularly effective. It has been found that these amino substituted organo silanes have a tendancy to volatilize from the insulation with an attendant loss of the ability of the insulation to resist water-treeing. Furthermore, such amino substituted organo silanes are disposed to the formation of gel specks in the insulation which, in turn, may serve as initiation points for water trees.

DESCRIPTION OF THE INVENTION

The present invention provides compositions, based on ethylene polymers which, when applied about electrical conductors, provide insulation thereon characterized by a number of desirable features. The compositions of this invention can be formulated as homogeneous mixtures and extruded about electrical conductors, providing insulation thereon which is resistant to water-treeing and maintains this resistivity over prolonged periods of time as little, if any premature volatilization of the N-phenyl substituted amino silane occurs from the ethylene polymer compositions. Also, insulation, produced from the compositions of this invention, is relatively free of gel specks, essentially resulting in even longer working life for the insulation.

The compositions of this invention comprise an ethylene polymer and an N-phenyl substituted amino silane wherein the amino silane is present in an amount of about 0.1 to about 3 percent by weight, preferably about 0.2 to about 2 percent by weight, based on the weight of the composition.

The N-phenyl substituted amino silanes which are added to the ethylene polymers, to provide compositions of this invention, have the formula:

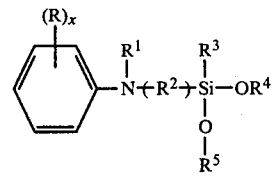

wherein: R is a monovalent hydrocarbon radical, generally having one to 18 carbon atoms inclusive, preferably having one to 8 carbon atoms inclusive, x is 0 to 1 inclusive, generally substituted ortho and para to the amino group, $R^1$ is hydrogen or a monovalent hydrocarbon radical, generally having one to 8 carbon atoms inclusive, preferably having one to 6 carbon atoms inclusive; $R^2$ is a divalent hydrocarbon radical generally having two to 6 carbon atoms inclusive and preferably having two to 4 carbon atoms inclusive; $R^3$ is a monovalent hydrocarbon radical or an oxy substituted hydrocarbon radical, generally having one to 18 carbon atoms inclusive, preferably having one to 12 carbon atoms inclusive; $R^4$ is a monovalent hydrocarbon radical having at least 8 carbon atoms generally having 8 to 18 carbon atoms inclusive, preferably having 8 to 14 carbon atoms inclusive; $R^5$ is a monovalent hydrocarbon radical, generally having one to 18 carbon atoms inclusive, preferably having 8 to 14 carbon atoms inclusive.

Illustrative hydrocarbon radicals for R are the following: alkyl radicals such as methyl, ethyl, n-propyl, isopropyl, n-butyl, n-octyl and the like; alkoxy radicals such as methoxy, ethoxy, n-propoxy, isopropoxy, n-butoxy, n-hexoxy, n-octoxy and the like; aryl radicals such as α-methylbenzyl, cumyl and the like.

Illustrative hydrocarbon radicals for $R^1$ are the following: alkyl radicals such as methyl, ethyl, n-propyl, n-butyl and the like; and aryl radicals such as phenyl.

Among suitable hydrocarbon radicals for $R^2$ are ethylene, propylene, butylene and other like alkylene radicals. Also suitable are alkylidene radicals such as propylidene and the like.

Among suitable radicals for $R^3$ are alkyl radicals such as methyl, ethyl, n-propyl, isopropyl, n-butyl, n-hexyl, n-octyl and the like; alkoxy radicals such as methoxy, ethoxy, n-propoxy, n-hexoxy, dodecyloxy, methoxyethoxy, and the like; aryl radicals such as phenyl, phenoxy, and the like; cycloaliphatic radicals such as cyclohexyl, cyclohexoxy and the like.

Among suitable hydrocarbon radicals for $R^5$ are alkyl radicals such as methyl, ethyl, n-propyl, isopropyl, n-butyl, n-hexyl, n-octyl, n-nonyl, n-decyl, n-dodecyl, n-tetradecyl, n-cetyl, n-stearyl and the like. Suitable radicals for $R^4$ are alkyl radicals, as defined for $R^5$ which have at least 8 carbon atoms.

The N-phenyl substituted amino silanes are conveniently prepared by known reactions of organic and silicon chemistry. A typical preparation might include, as the first step, the hydrosilation of allyl chloride with trichlorosilane producing 3-chloropropyltrichlorosilane. This intermediate is reacted with ethanol to produce 3-chloropropyltriethoxysilane which, in turn, is reacted with aniline to give 3-(N-phenylaminopropyl-triethoxysilane). The amino functional silane is then transesterified with appropriate molar equivalents of higher alcohols such as dodecanol or $C_{12}/C_{14}$ alcohol mixtures to yield the desired product.

Ethylene polymers, which are used to formulate the compositions of this invention, are normally solid homopolymers of ethylene, copolymers of ethylene and $\alpha$-olefins and copolymers of ethylene and diene monomers. Exemplary of suitable copolymerizable monomers are $\alpha$-olefins such as propylene, butene-1, pentene-1, hexene-1, and the like; diene monomers such as butadiene, isoprene and the like; wherein the polymers contain at least about 70 percent by weight ethylene.

Preferred copolymers are ethylene-propylene copolymers, ethylene-butene copolymers and the like. These copolymers can be produced under low pressure of about 15 to about 300 psi, using a chromium oxide catalyst modified with titanium as disclosed in U.S. Pat. No. 4,011,382 granted Mar. 8, 1977.

The compositions of the present invention can contain crosslinking agents when the compositions are to be used as vulcanized or crosslinked products rather than as thermoplastic compositions. Vulcanizing or crosslinking agents are well known in the art and include organic peroxides as described in U.S. Pat. No. 3,296,189. These compounds can be used singly, or in combination with one-another, or in combination with a crosslinking booster such as a methylvinyl siloxane.

Also, the compositions of this invention can contain antioxidants such as sterically hindered phenols and amines, polymerized 2,2,4-tetramethylhydroquinoline, 4,4'-thio-bis(3-methyl-6-tert-butylphenol), thio-diethylene-bis-(3,5-ditert-butyl-4-hydroxy)hydrocinnamate, distearyl-thio-diproprionate and the like.

If desired, other polymers such as polypropylene, ethylene propylene rubber, ethylene-propylene diene rubber and the like can be added to the compositions of this invention.

In general, materials commonly added to ethylene polymer compositions to be used in electrical applications can be used as additives. It is to be noted, however, that fillers such as carbon black, clay, talc, silica, magnesium oxide and the like are not to be added to the compositions of the present invention.

It is to be understood that mixtures of ethylene polymers, N-phenyl substituted amino silanes and additives can be used, if so desired.

Compositions were formulated and tested for Water Tree Growth Rate (WTGR). The WTGR of the compositions tested was compared to the WTGR of Controls.

WTGR was determined as described in detail in U.S. Pat. No. 4,263,158, the disclosure of which is incorporated herein by reference, with the exception that during the time span of some experiments, the test frequency was changed from 8.5 to 1.0 KHZ.

The following procedures were used in formulating compositions of Table 1 and in preparing plaques therefrom.

Ethylene polymer, N-phenyl substituted amino silane and antioxidant were charged to a Banbury mixer and compounded to a melt temperature of about 140° C. The resultant composition was sheeted on a two-roll mill, granulated, compression molded into test specimens and tested for WTGR.

In those instances in which the composition was crosslinked, the ethylene polymer was charged into a Brabender mixer, along with antioxidant, di-$\alpha$-cumyl-peroxide and sym-tetramethyltetravinyl cyclotetrasiloxane and the resultant mixture compounded to a melt temperature of about 120° C. The composition was granulated and compression molded into test specimens at a temperature of 125° C. Test specimens were cured while in the mold at a temperature of 180° C. Before testing for WTGR, each cured test specimen was annealed for 15 minutes in an oven, which was at a temperature of 115° C. Peroxide residues were removed by heating the test specimens for seven days in a vacuum oven, which was at a temperature of 85° C.

DESCRIPTION OF POLYMERS

A—High pressure polyethylene having a melt index of 0.2 dg/min and a density of 0.92 g/cc.

B—Low pressure ethylene-butene copolymer having a melt index of 0.7 dg/min and a density of 0.92 g/cc.

C—High pressure polyethylene having a melt index of 2 dg/min and a density of 0.92 g/cc—also contained about two percent by weight di-$\alpha$-cumyl peroxide and 0.6 percent by weight siloxane.

DESCRIPTION OF ANTIOXIDANTS

I—4,4'-thio-bis(6-tert-butyl-3-methylphenol).

II—thiodiethylene-bis(3,5-di-tert-butyl-4-hydroxy) hydrocinnamate + distearylthiodipropionate (equal concentrations).

III—thiodiethylene-bis(3,5-di-tert-butyl-4-hydroxy) hydrocinnamate.

| CONTROLS (Prepared as Described Above Without any Organo Silane) | | |
|---|---|---|
| Polymer | Antioxidant | WTGR |
| A | I (0.1% by wt) | 1.0 |
| B | I (0.1% by wt) | 1.0 |
| B | III (0.1% by wt) | 1.0 |
| C (crosslinked) | II (0.36% by wt) | 0.9–1.8 |

TABLE 1

| Example | N—phenyl Substituted Amino Silane | | % by Wt. Amino Silane | Antioxidant 0.1% by Wt. | Ethylene Polymer | Freq. KHZ | WTGR |
|---|---|---|---|---|---|---|---|
| | Amino Group | Silyl Ester | | | | | |
| 1 | Φ-NH—C$_3$H$_6$ | (OC$_{12}$H$_{25}$)$_3$ | 0.5 | III | B | 8.5 | 0.10 |
| 2 | Φ-NH—C$_3$H$_6$ | (OC$_{12}$H$_{25}$)$_3$ | 1.0 | III | B | 8.5 | 0.06 |
| 3 | Φ-NH—C$_3$H$_6$ | (OC$_{12}$H$_{25}$)$_3$ | 2.0 | III | B | 8.5 | 0.05 |
| 4 | Φ-NH—C$_3$H$_6$ | | 0.5 | I | B | 8.5 | 0.13 |
| 5 | Φ-NH—C$_3$H$_6$ | | 0.6 | I | B | 8.5 | 0.10 |
| 6 | Φ-NH—C$_3$H$_6$ | (OC$_2$H$_5$)$_{1.5}$ $\alpha$ | 0.75 | I | B | 8.5 | 0.04 |
| 7 | Φ-NH—C$_3$H$_6$ | (OC$_{12}$/C$_{14}$)$_{1.5}$ $\alpha$ | 0.5 | I | A | 1.0 | 0.04 |
| 8 | Φ-NH—C$_3$H$_6$ | | 1.0 | I | A | 1.0 | 0.02 |

TABLE 1-continued

| Example | N—phenyl Substituted Amino Silane Amino Group | Silyl Ester | % by Wt. Amino Silane | Antioxidant 0.1% by Wt. | Ethylene Polymer | Freq. KHZ | WTGR | |
|---|---|---|---|---|---|---|---|---|
| 9[β] | Φ-NH—C$_3$H$_6$ | | 0.7 | II | C | 1.0 | 0.09 | (Value calculated based on control A) |

[a] = Compositions of Examples 4-9 prepared from mixed C$_{12}$-C$_{14}$ alcohols
[β] = Crosslinked

What is claimed is:

1. A composition, devoid of fillers, comprising an ethylene polymer and an N-phenyl substituted amino silane having the formula:

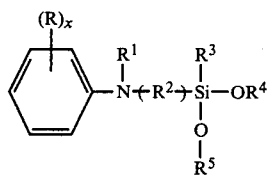

wherein: R is a monovalent hydrocarbon radical; x is 0 to 1 inclusive; $R^1$ is hydrogen or a monovalent hydrocarbon radical; $R^2$ is a divalent hydrocarbon radical; $R^3$ is a monovalent hydrocarbon radical or an oxy substituted hydrocarbon radical; $R^4$ is a monovalent hydrocarbon radical having at least 8 carbon atoms and $R^5$ is a monovalent hydrocarbon radical; wherein said N-phenyl substituted amino silane is present in an amount sufficient to improve the water-treeing resistance of said composition.

2. A composition, as defined in claim 1, comprising an ethylene polymer and an N-phenyl substituted amino silane having the formula:

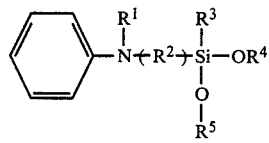

wherein: $R^1$ is hydrogen or alkyl having one to 6 carbon atoms; $R^2$ is alkylene or alkylidene having 2 to 4 carbon atoms, $R^3$ is alkyl, alkoxy, aryl or cycloaliphatic; $R^4$ is alkyl of 8 to 18 carbon atoms; and $R^5$ is alkyl of one to 18 carbon atoms.

3. A composition as defined in claim 2 wherein the N-phenyl substituted amino silane is present in an amount of about 0.1 to about 3 percent by weight based on the weight of the composition.

4. A composition as defined in claim 2 wherein the N-phenyl substituted amino silane is present in an amount of about 0.2 to about 2 percent by weight based on the weight of the composition.

5. A composition as defined in claim 2 wherein the ethylene polymer is polyethylene.

6. A composition as defined in claim 2 wherein the ethylene polymer is a copolymer of ethylene and butene.

7. A composition as defined in claim 2 which contains a crosslinking agent.

8. A composition as defined in claim 7 wherein the crosslinking agent is di-α-cumyl peroxide.

9. A composition as defined in claim 8 which contains sym-tetramethyltetravinyl cyclotetrasiloxane.

10. The crosslinked product of the composition defined in claim 7, claim 8, or claim 9.

11. A composition as defined in claim 2 wherein the N-phenyl substituted amino silane has the formula:

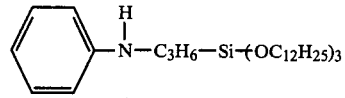

12. A composition as defined in claim 2 containing a mixture of N-phenyl substituted amino silanes having, on average, a formula:

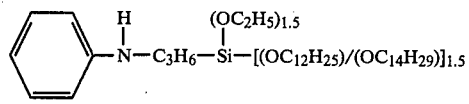

13. A method of improving the water-treeing resistance of an ethylene polymer which comprises adding thereto in an amount of about 0.1 to about 3 percent by weight, an N-phenyl substituted amino silane having the formula:

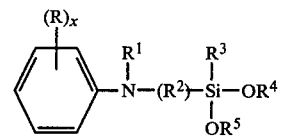

wherein: R is a monovalent hydrocarbon radical, x has a value of 0 to 1 inclusive; $R^1$ is hydrogen or a monovalent hydrocarbon radical; $R^2$ is a divalent hydrocarbon radical; $R^3$ is a monovalent hydrocarbon radical or oxy substituted hydrocarbon radical; $R^4$ is a monovalent hydrocarbon radical having at least 8 carbon atoms, and $R^5$ is a monovalent hydrocarbon radical.

14. An electrical conductor having as insulation thereon the composition or crosslinked composition defined in claim 1.

* * * * *

UNITED STATES PATENT AND TRADEMARK OFFICE
CERTIFICATE OF CORRECTION

PATENT NO. : 4,376,180
DATED : March 8, 1983
INVENTOR(S) : Robert J. Turbett et al It is certified that error appears in the above—identified patent and that said Letters Patent is hereby corrected as shown below:

Column 3, line 22; "15" should read --150--.

Signed and Sealed this

Twenty-fourth Day of May 1983

[SEAL]

Attest:

DONALD J. QUIGG

Attesting Officer     Acting Commissioner of Patents and Trademarks